Inventor
Thomas K. Vincent
By W. N. Roach
Attorney

Jan. 26, 1937.  T. K. VINCENT  2,068,720
PACKING FOR SEALING HIGH PRESSURE FLUIDS
Filed Jan. 11, 1935   2 Sheets-Sheet 2
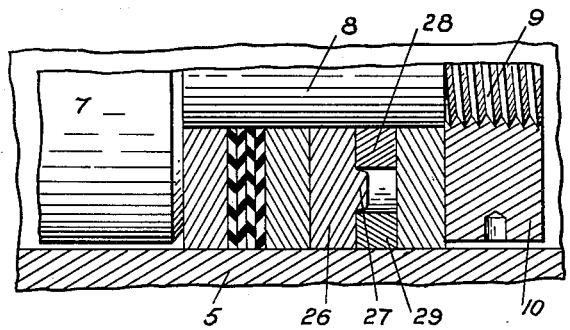
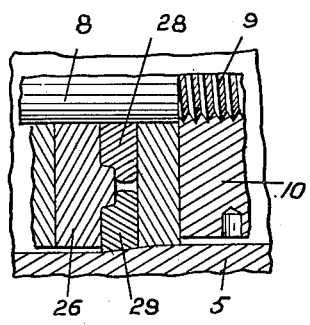
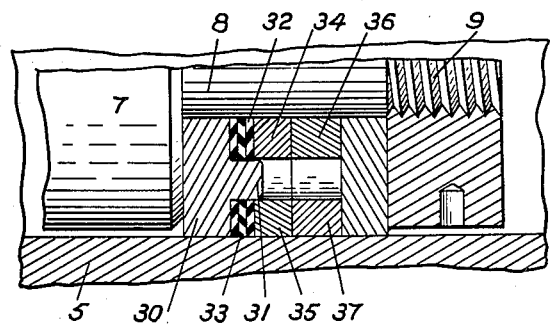
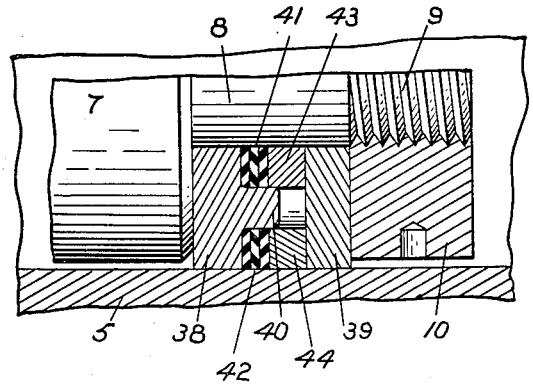
Inventor
Thomas K. Vincent
By W. N. Roach
Attorney Patented Jan. 26, 1937

2,068,720

UNITED STATES PATENT OFFICE 2,068,720

PACKING FOR SEALING HIGH PRESSURE FLUIDS

Thomas K. Vincent, U. S. Army, Manhattan, Kans.

Application January 11, 1935, Serial No. 1,321

7 Claims. (Cl. 288—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to packing for sealing high pressure fluids and is an improvement on the packing shown in Patent No. 1,725,836 of August 27, 1929.

In the patent the unsupported portion of the pressure transmitting side of a differential packing ring has an annular tongue which is disposed between inner and outer packing rings. This construction is expensive and the arrangement has failed to function in a satisfactory manner. When the packing is subjected to high pressures, the cylinder is dilated by the pressure medium while the mandrel or spool retains its original diameter. The inner and outer packing rings are being compressed and naturally tend to expand radially but this is prevented in the case of the inner ring by the tongue and also by the spool.

The purpose of this invention is to provide an inexpensive packing wherein the unsupported portion of the differential packing ring does not prevent radial expansion of the inner and outer packing rings but is arranged to utilize the expansion of the rings to effect a seal.

A further object of the invention is to arrange a plurality of packing rings so that they are subjected to pressure in the order of their ductility.

To these and other ends, the invention consists in the construction, arrangement and combination of elements described hereinafter and pointed out in the claims forming a part of this specification.

Several practical embodiments of the invention are illustrated in the accompanying drawings, wherein:

Fig. 3 is a sectional view of a modified form of packing prior to being deformed.

Fig. 4 is a similar view of the packing of Fig. 3 after being deformed.

Figs. 5 and 6 are sectional views showing variations of the packing of Fig. 3.

Figure 1:
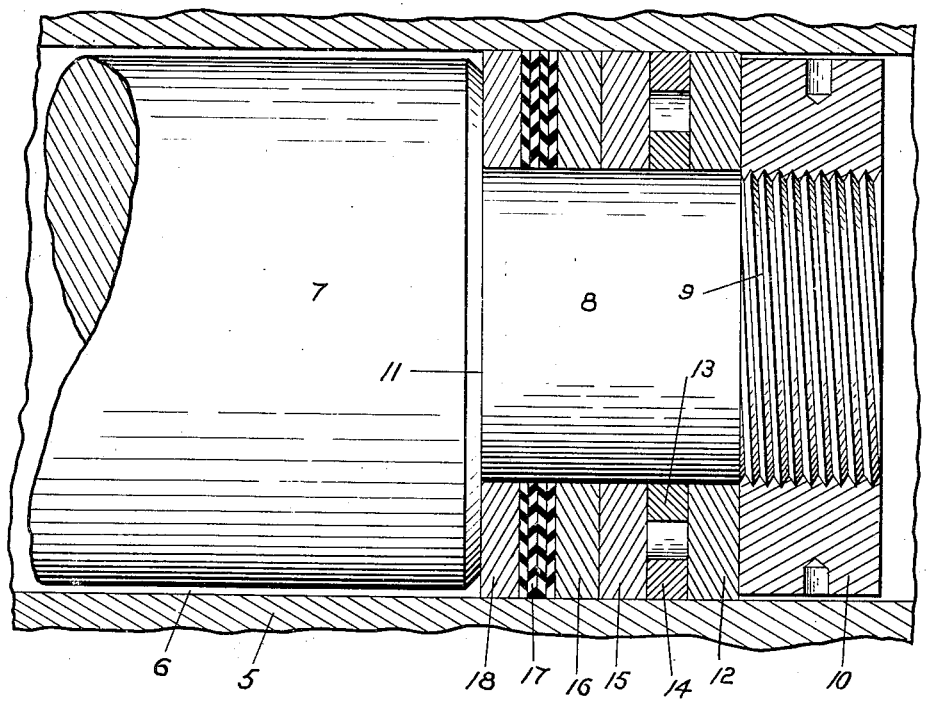
Fig. 1 is a fragmentary longitudinal sectional view through a cylinder which is sealed by packing constructed and arranged in accordance with the invention.

Referring to Fig. 1, the improved packing is used, for example, in cold working apparatus wherein a cylindrical object 5, such as a gun tube, is to be subjected to a high pressure fluid with a view to permanently enlarging its bore and increasing its elastic limit. In order to confine the fluid in the chamber 6 of the tube, the open ends of the chamber must be plugged and properly packed. A convenient method of plugging the ends and at the same time reducing the area of the chamber and the amount of fluid required is to insert in the tube a mandrel or spool 7 of a sufficient length to enable the packing carried thereby to be positioned in the ends of the tube.

The spool has a reduced portion 8 serving to hold and guide the component parts of a packing unit and a threaded outer portion 9 for receiving a nut 10 which holds the packing unit in place against the shoulder 11 of the spool.

The packing unit consists, in the order named, of a supporting ring 12 of steel or hard metal seated on the nut 10, radially spaced rings comprising an inner ring 13 and an outer ring 14 of steel, a ring 15 of brass or harder metal, a ring 16 of a softer metal such as copper, non-metallic rings 17 of leather or rubber and a steel ring 18 seated against the shoulder 11.

On admission of a high pressure medium to the chamber the packing rings are forced outwardly towards the fixed nut 10 and are accordingly compressed and moved into close contact with the spool and the cylinder. Since the effective area of the inner ring 13 and outer ring 14 is less than the area of the ring 15 the pressure per unit of area on the inner and outer rings is greater than the pressure per unit of area on the pressure side of the ring 15 and also greater than the unit pressure exerted by the fluid. The rings 13, 14 and 15 are substantially plastic when subjected to high pressure and as a result they will be compressed and will expand radially, maintaining contact with the spool and the cylinder. The pressures are so great that the rings are permanently deformed, the central portion of the brass ring 15 bulging into the space between the steel rings 13 and 14. The edges of the steel rings cut into the brass ring at the bulge and establish an effective seal which prevents passage of the pressure medium.

The purpose of arranging the rings 12 to 17 in the order of their ductility is to bring them successively into play as the pressure is increased. For example the rubber and leather packing serves to prevent leakage at the start of the operation, after which the metal rings are relied on to maintain the seal as the pressure is increased. It is absolutely essential that leakage be prevented from the very start of the operation. If the pressure medium should leak past the first rings and enter the space between the inner and outer rings 13 and 14 the subsequent high pressure will cause a rupture of the end of the spool.

Figure 2:
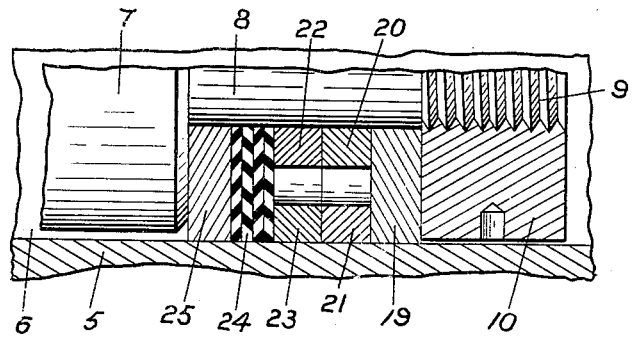
Fig. 2 is a similar view showing another form of the invention.

Another form of the packing is shown in Fig. 2 and comprises a steel supporting ring 19, a pair of radially spaced brass rings 20—21, a pair of radially spaced copper rings 22—23, non-metallic rings 24 and a steel ring 25. In this arrangement the rubber bulges into the space between the rings 22—23.

In Fig. 3 the pressure transmitting ring 26 is of steel and is formed with a short annular rib 27 which projects a short distance into the space between the inner ring 28 and the outer ring 29 which are of softer metal. When the rings are deformed on application of the pressure medium they will fold over the edge of the rib 27 as indicated in Fig. 4. The metal of the rings and of the rib is practically fused and positively prevents passage of the fluid medium.

An alternate arrangement is shown in Fig. 5 in which the pressure transmitting ring 30 of steel has a rib 31 which extends through non-metallic rings 32—33 and projects into the space between an inner copper ring 34 and an outer copper ring 35. When an additional mass of metal is required a pair of brass rings 36 and 37 are placed next to the copper rings.

In Fig. 6 a simple packing comprises steel end rings 38 and 39, the ring 38 having a rib 40 extending through non-metallic rings 41—42 and partially between soft metal rings 43—44.

I claim:

1. In high pressure apparatus including concentric cylindrical members having spaced seating surfaces, a packing of adjoining rings between said members and said seating surfaces, said packing including in the order of arrangement towards the pressure side of the assembly a supporting ring, a pair of radially spaced metallic rings having unsupported adjacent faces, a pressure-transmitting ring of softer material and greater area than the radially spaced rings, rings of different materials and having ductility decreasing towards the pressure side of the assembly, and a pressure-receiving end ring of relatively hard metal.

2. In high pressure apparatus including concentric cylindrical members having spaced seating surfaces, a packing of adjoining rings between said members and said seating surfaces, said packing including in the order of arrangement towards the pressure side of the assembly a supporting ring, a pair of radially spaced rings of hard metal having unsupported adjacent faces, and a pressure-transmitting ring of softer material and greater area than the radially spaced rings and extending across said rings.

3. In high pressure apparatus including concentric cylindrical members having spaced seating surfaces, a packing of adjoining rings between said members and said seating surfaces, said packing including in the order of arrangement towards the pressure side of the assembly a supporting ring, a pair of radially spaced rings of soft metal having unsupported adjacent faces, and a pressure-transmitting ring of harder material and greater area than the radially spaced rings and extending across said rings.

4. In high pressure apparatus including concentric cylindrical members having spaced seating surfaces, a packing of adjoining rings between said members and said seating surfaces, said packing including in the order of arrangement towards the pressure side of the assembly a supporting ring, a pair of radially spaced metallic rings having unsupported adjacent faces, a non-metallic ring of greater area than the radially spaced rings and extending across said rings, and a metallic pressure-transmitting ring.

5. In high pressure apparatus including concentric cylindrical members having spaced seating surfaces, a packing of adjoining rings between said members and said seating surfaces, said packing including in the order of arrangement towards the pressure side of the assembly a supporting ring, a pair of radially spaced metallic rings having unsupported adjacent faces, a pressure-transmitting ring of different ductility and greater area than the radially spaced rings and extending across said rings.

6. In high pressure apparatus including concentric cylindrical members having spaced seating surfaces, a packing of adjoining rings between said members and said seating surfaces, said packing including in the order of arrangement towards the pressure side of the assembly a supporting ring, a pair of radially spaced rings of soft metal, a non-metallic ring against each one of the radially spaced rings, and a pressure-transmitting ring of hard metal having an annular rib extending between the non-metallic rings and partially into the space between the radially spaced rings of soft metal.

7. In high pressure apparatus including concentric cylindrical members having spaced seating surfaces, a packing of adjoining rings between said members and said seating surfaces, said packing including in the order of arrangement towards the pressure side of the assembly a supporting ring, a pair of radially spaced rings of soft metal, and a pressure-transmitting ring of hard metal having an annular rib extending partially into the space between the soft metal rings whereby on compression of the assembly the rib will cut into the soft rings to establish a seal.

THOMAS K. VINCENT.